United States Patent [19]

Wright et al.

[11] 4,332,605

[45] Jun. 1, 1982

[54] THERMALLY TREATING ARTICLES WITH PARTICULATE MATERIAL AND APPARATUS THEREFOR

[75] Inventors: Donald C. Wright; Gordon T. Simpkin, both of Lancashire, England

[73] Assignee: Pilkington Brothers Limited, England

[21] Appl. No.: 198,617

[22] Filed: Oct. 20, 1980

[30] Foreign Application Priority Data

Oct. 23, 1979 [GB] United Kingdom ............... 7936683

[51] Int. Cl.³ .......................................... C03B 27/00
[52] U.S. Cl. ..................................... 65/114; 65/348; 65/349; 34/10; 165/104.16; 165/104.18; 165/104.34
[58] Field of Search ................... 65/114, 349, 348; 165/104.16, 104.18, 104.34; 34/10

[56] References Cited

U.S. PATENT DOCUMENTS

| 4,113,458 | 9/1978 | Cross | ..................................... 65/114 |
| 4,115,927 | 9/1978 | Rosensweig | .......................... 34/10 X |
| 4,272,893 | 6/1981 | Levenspiel et al. | ................. 34/10 X |

Primary Examiner—Arthur D. Kellogg
Attorney, Agent, or Firm—Burns, Doane, Swecker & Mathis

[57] ABSTRACT

The invention provides a method and apparatus for treating articles with particulate material, for example for thermally toughening glass sheets. The particulate material consists of or contains permanently magnetized particles and is subjected to an electromagnetic field which travels linearly through the treatment space and is effective to sustain a dispersion of the particulate material in the treatment space. The article is contacted with that dispersion.

17 Claims, 2 Drawing Figures

THERMALLY TREATING ARTICLES WITH PARTICULATE MATERIAL AND APPARATUS THEREFOR

BACKGROUND OF THE INVENTION

This invention relates to a method and apparatus for treating articles with particulate material and to articles treated by the method. The invention may be employed for thermally toughening glass sheets and glass lenses.

It has already been proposed to effect thermal treatment of articles, for example glass sheets, by contacting the articles with particulate material in a fluidised state. In one such proposal a glass sheet is thermally toughened by heating the sheet to a temperature above its strain point and then quenching the sheet in a fluidised bed of particulate material, for example alumina.

It has been preferred to maintain the particulate material in a quiescent uniformly expanded state of particulate fluidisation. To achieve such a state of fluidisation the density of the particulate material must not be so great that the material can only be fluidised in a bubbling state.

The intensity of the thermal treatment of articles, in particular the rate of extraction of heat from the surfaces of a glass sheet which is being thermally toughened by being quenched in the fluidised particulate material, is increased if the thermal capacity of the material can be increased. This would suggest the use of denser, and therefore heavier, particles, and there is a problem in producing a non-bubbling dispersion of such heavier particles which treats the surfaces of the article uniformly and has a high heat transfer coefficient with respect to the surfaces of the article being treated.

In particular there is a problem in maintaining in a non-bubbling state a bed of high density particulate material of sufficient depth for quenching large glass sheets which are used singly as a vehicle windscreen or as a component of a laminated windscreen.

There have been proposals for suppressing bubbling in fluidised beds of inert materials such as catalyst materials.

In U.S. Pat. No. 3,439,899 there is disclosed a proposal for fluidising a mass of particles which are not fluidisable by gas, for example sand, by mixing the sand with permanent magnet particles, for example barium ferrite permanent magnet particles, passing gas upwardly through the mass, and subjecting the particles to a magnetic field which varies in intensity and direction to impart sufficient individual motion to the permanent magnet particles to enable the particulate mass to become fluidised. A small fluidised bed up to about 25 cm deep could be produced in this way.

United Kingdom Specification No. 1,525,754 discloses a magnetically stabilised fluidised bed in which the formation of bubbles is suppressed by mixing with the silica, alumina or catalyst particles of the bed a proportion of magnetizable material, and subjecting the bed to a uniform magnetic field acting in a direction opposite to the fluidising gas. All ferromagnetic and ferrimagnetic substances may be used as the magnetizable material including ferrites of the form $XO.Fe_2O_3$ wherein X is a metal or a mixture of metals such as zinc, manganese or copper.

United Kingdom Specification No. 2,002,254 discloses fluidised catalytic cracking catalysts, in particular the zeolite type catalysts in which a crystalline aluminosilicate is dispersed with a siliceous matrix. Bubbling is suppressed by mixing with the catalyst material a magnetizable substance such as a powdered ferrite of the form $XO.Fe_2O_3$, wherein X is a metal or a mixture of metals such as manganese, copper, barium and strontium. The mixture is subjected to a magnetizing field to magnetize the magnetizable particles which then exert magnetic attractive forces on one another which stabilize the fluidised bed.

SUMMARY OF THE INVENTION

It is a main object of the present invention to solve the problem of how to produce a bed of uniformly dispersed high density particulate material consisting of or containing particulate ferromagnetic material.

The invention provides a method of treating an article with a particulate material consisting of or containing permanently magnetized particles which particulate material is subjected in a treatment space to the influence of a travelling electromagnetic field which travels linearly through the treatment space and is effective to sustain a dispersion of the particulate material in the treatment space, and contacting the article with the dispersion in that treatment space.

A preferred application of the method is for thermally treating flat glass, by subjecting the particulate material to a linearly travelling electromagnetic field which is applied over the whole treatment space.

The electromagnetic field is preferably an upwardly travelling field.

The particulate material may be particulate non-magnetic material mixed with permanently magnetized particles, which mixture is gas-fluidised and subjected to said travelling electromagnetic field.

The particulate material may comprise powdered alumina, alumino-silicate, aluminium monohydrate, aluminium trihydrate, or sodium bicarbonate, mixed with the permanently magnetized particles.

The permanently magnetized particles may be particles of a ferrite material. A substance containing ferrite or similar material may be used.

The ferrite material may be a magnetoplumbite having the general formula $AO.6B_2O_3$ where A is divalent barium, strontium or lead and B is trivalent aluminium, gadolinium, chromium or iron.

The ferrite material may be barium hexaferrite $(BaO.6Fe_2O_3)$ or strontium hexaferrite $(SrO.6Fe_2O_3)$.

The dispersion may be sustained by travelling electromagnetic fields which are effective from opposite sides of the treatment space, and the glass is moved into the dispersion along a path nearer to one side of the treatment space.

The method can be employed for thermally toughening a glass sheet, by heating the glass sheet to a temperature above its strain point and then quenching the hot sheet, characterised by maintaining the dispersion at a temperature such that the sheet is toughened when quenched in the dispersion.

The invention also provides apparatus for treating an article including means defining a treatment space for containing a particulate material, means for advancing the article into the treatment space, and linear induction means mounted so as to generate a travelling electromagnetic field which travels linearly through the treatment space and is of sufficient intensity to sustain in the treatment space a dispersion of the particulate material which consists of or contains permanently magnetized particles.

Preferably a linear induction motor is mounted at one side of a container which defines the treatment space, which motor is oriented to generate an upwardly travelling electromagnetic field in the container and thereby create the dispersion of the particulate material in the treatment space.

For thermally toughening a glass sheet there may be two linear induction motors respectively mounted at oppositely facing sides of the container which is of elongated rectangular cross-section and has an open top, which motors are operable to cause agitation of the particulate material in the container.

The motors may be adapted effectively to stagger the poles of one motor with respect to the poles of the other motor.

Cooling means may be mounted at the bottom of the container to cool the particulate magnetic material which collects at the bottom of the container.

Also gas supply means may be mounted at the bottom of the container to supply fluidising gas into the particulate material at the bottom of the container.

BRIEF DESCRIPTION OF THE DRAWINGS

Some embodiments of the invention will now be described, by way of example, with reference to the accompanying drawings, in which.

DESCRIPTION OF THE PREFERRED EMBODIMENTS

Figure 1:
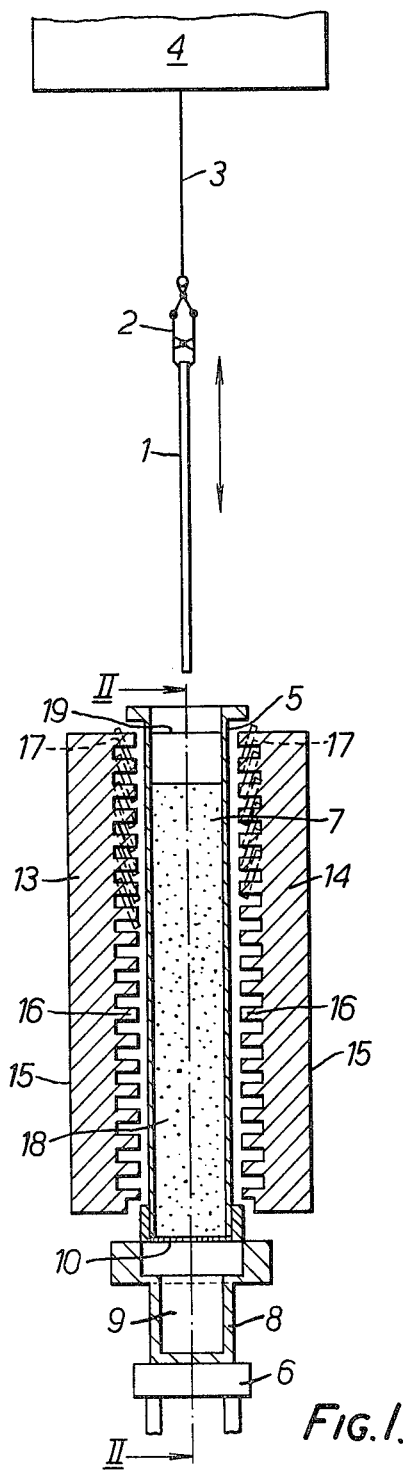
FIG. 1 is a diagrammatic side elevation, partly in section of apparatus according to the invention for thermally toughening a glass sheet by the method of the invention.
Figure 2:
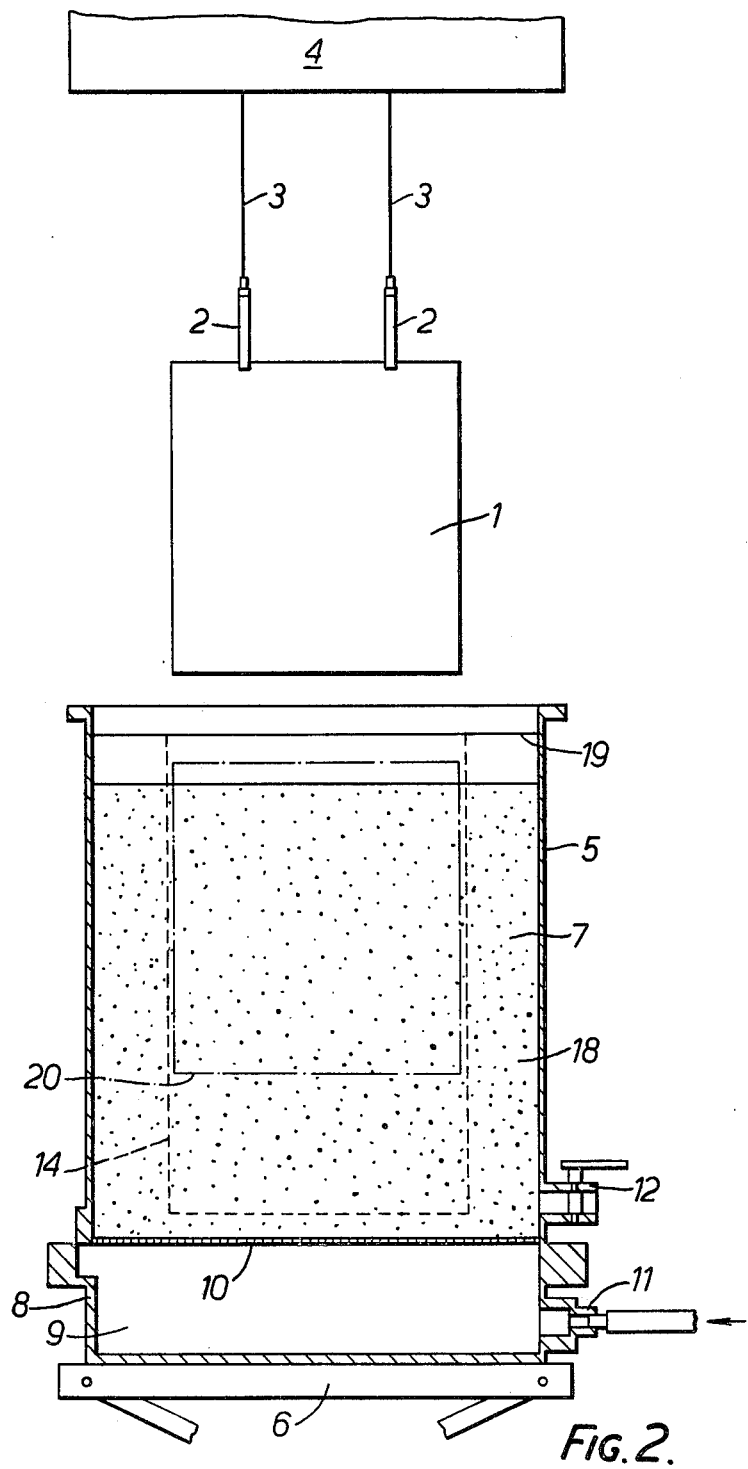
FIG. 2 is a front elevation of the apparatus of FIG. 1, partly in section on line II—II of FIG. 1.

In the preferred method and apparatus illustrated in the drawings a glass sheet is to be thermally toughened. The upper edge of the sheet 1 is engaged by tongs 2 which, in conventional manner, are suspended by cables 3 from a hoist mounted above an electric furnace 4. The hoist cables 3 extend through the furnace so that the glass sheet 1 can be raised into the furnace 4 for heating to a temperature above its strain point prior to quenching.

A container 5 of elongated rectangular horizontal cross-section, with an open top, is mounted on a scissors-lift table 6 beneath the furnace. The table 6 is shown in its lowered position leaving sufficient space beneath the furnace for the glass sheet 1 to be loaded on to the tongs.

The container 5 is made of a magnetically transparent material, for example non-magnetic stainless steel, and defines a treatment space 7 in which a dispersion of particulate material is maintained. The horizontal cross-sectional dimensions and depth of the container 5 are sufficient to readily accommodate the glass sheet 1, which is shown as a rectangular sheet, but may be a shaped glass sheet to be used singly as a vehicle windscreen or as part of a composite aircraft windscreen, or road or rail vehicle windscreen.

The base part 8 of the container, which is not necessarily made of magnetically transparent material, defines a plenum chamber 9 which is separated from the main part of the container by a porous membrane 10 which may be a porous ceramic plate or a sintered metal plate. Fluidising gas is supplied under pressure to the plenum chamber 9 through a supply inlet 11. There is a valved outlet 12 for powder just above the level of the porous membrane 10.

Two linear induction motors 13 and 14, sometimes referred to as linear alternating current motors, are respectively mounted outside oppositely facing sides of the container. Each of the linear induction motors is a three-phase motor of conventional design and the stator or primary of each motor is built up from soft iron laminations. Each stator has a flat back 15 with a plurality of parallel limbs 16 projecting towards the side walls of the container 5. The ends of the limbs 16 may touch the container 5 or be just slightly spaced from the container walls as illustrated. In the embodiment illustrated the limbs 16 of the two motors face each other. The three-phase windings of each of the motors, indicated at 17 are housed in conventional manner in the slots between the limbs 16.

Cooling pipes may be mounted in the container 5 just above the membrane 10 and are connected to a supply of cooling water.

The container holds a quantity of particulate material 18 which consists of or contains permanently magnetized particles.

The material 18 is illustrated in its non-fluidised state only partially filling the container 5.

For the thermal toughening of glass it has been found advantageous to use as the particulate material a mixture of permanently magnetized particulate ferromagnetic material and a particulate non-magnetic refractory material, for example powdered alumina as γ-alumina, powdered aluminium monohydrate or powdered aluminium trihydrate.

The particulate ferromagnetic material is preferably a particulate ferrite material. To impart the required drive to the particulate material when under the influence of the fields of the linear induction motors, a particularly effective ferrite is a magnetoplumbite having the general formula

$$AO.6B_2O_3$$

where A is divalent barium, strontium or lead, and B is trivalent aluminium, gadolinium, chromium or iron.

Specially suitable ferrites which could be produced in the required particulate form are spray-dried barium hexaferrite ($BaO.6Fe_2O_3$) and strontium hexaferrite ($Sr.O.6Fe_2O_3$).

The selected particulate ferrite material was permanently magnetized and then mixed in predetermined proportions with the selected non-magnetic powdered refractory material and the mixture 18 was placed in the container 5.

When the glass sheet 1 has been raised into the furnace 4, the scissors-lift table 6 was raised by jacks to a position in which the open top of the container 5 was just below the closed mouth in the bottom of the furnace. While the table 6 was being raised, fluidising air was supplied to the plenum chamber and the particulate material became gas-fluidised by upward flow of fluidising air through the porous membrane 10. This caused the particulate material to expand upwardly in the container 5.

Just before the furnace mouth was opened preparatory to lowering the hot glass sheet into the treatment space 7, the three-phase supply to the linear induction motors 13 and 14 was switched on, and the upwardly-travelling electromagnetic fields of the motors, which travel linearly through the treatment space, generate contained upward flow of the particulate material, by the action of the fields on the ferrite material. The ferrite material acts as a driver to generate strongly agitated motion of the particulate material which expanded to a level 19 near the top of the container. The surface level 19 of the expanded particulate material was in the region of the tops of the stators of the motors 13 and 14.

The components of the particulate material did not separate and the effect of the upwardly-travelling electromagnetic field was to create a strongly agitated dispersion of the particulate material in the fluidising gas which was maintained substantially uniform throughout the deep treatment space in the container.

When the glass had been heated to a temperature above its strain point it was lowered into the gaseous dispersion of particulate material in the treatment space 7 to a position indicated at 20 in which the glass is completely immersed and quenched in the dispersion of particulate material. The glass was held suspended in the treatment space 4 until the whole of the glass had cooled well below the strain point of the glass and toughening stresses were developing in the glass sheet in known manner. Maximum toughening effect has been observed when the glass is moved into the dispersion along a path near to one side of the treatment space, that is offset from the central plane between the two motors.

Even though the hot glass may have been heated to a temperature above the Curie point of the particulate ferrite material, for example the glass may be at a temperature of 630° C. to 680° C. when it is lowered into the gaseous dispersion, no significant deterioration was observed in the state of permanent magnetization of the ferrite material and its ability to cause expansion of the dispersion during a period of time in which several hot glass sheets were processed.

Regulation of the degree of toughening was achieved by varying the proportions of the particulate ferromagnetic material and the particulate non-magnetic refractory material in the mixture, because the presence of the proportion of non-magnetic material varies the heat transfer coefficient of the gaseous dispersion with respect to the glass surfaces.

This is illustrated with reference to the following examples which set out results obtained with an experimental apparatus which simulates the thermal toughening of a glass sheet for use singly as a motor vehicle windscreen or as a component of a laminated glass windscreen.

The container 5 was 450 mm long×43 mm wide×600 mm deep. The linear induction motors 13 and 14 were constructed with 1 slot per pole per phase, ⅔ chorded with a pole pitch of 50 mm. Each coil of each phase winding contains 9 turns. Each phase winding was supplied with 50 amperes. When the motors were switched on the gaseous dispersion of the fluidised particulate material rose up to the level 19 which was about 50 mm below the top of the container.

The particulate material used was a mixture of particulate barium hexaferrite having the following properties:
mean particle size = 150 μm
particle size range = 20 to 300 μm; 76% > 150 μm
with particulate aluminum trihydrate having the following properties:
mean particle size = 66 μm
particle size range = 20 to 120 μm
Before mixing with the aluminum trihydrate the particulate barium hexaferrite was permanently magnetized by packing the powder into a tube and passing the tube between the poles of a permanent magnet having a field strength of $7 \times 10^6/4\pi$ A/m.

Sheets of glass of size 250 mm×250 mm and 2.3 mm thick were suspended from the tongs and heated in the furnace to an average glass temperature in the range about 650° C. to 680° C. and the glass sheets were quenched in the dispersion of particulate material constituted by a range of mixtures of barium hexaferrite and aluminum trihydrate extending from 100% by weight of aluminum trihydrate to 100% by weight of barium hexaferrite. The temperature of the particulate material was maintained at about 60° C. to 100° C.

The average central tensile stress induced in each quenched sheet was measured by averaging the values measured at the top, middle and bottom of each sheet.

The results obtained are set out in the following table:

| Example | Glass Temperature °C. | Particulate Material Composition (weight %) | | Air Flow litres/min | Average Central Tensile Stress $MN/m^2$ |
| --- | --- | --- | --- | --- | --- |
| | | Barium hexaferrite | Aluminium trihydrate | | |
| 1 | 675 | 0 | 100 | 30 | 44 |
| 2 | 658 | 6.5 | 93.5 | 30 | 50 |
| 3 | 654 | 6.5 | 93.5 | 20 | 51 |
| 4 | 652 | 6.5 | 93.5 | 20 | 47 |
| 5 | 659 | 12.5 | 87.5 | 30 | 62 |
| 6 | 664 | 12.5 | 87.5 | 30 | 62 |
| 7 | 667 | 20.5 | 79.5 | 25 | 72 |
| 8 | 670 | 20.5 | 79.5 | 25 | 68 |
| 9 | 666 | 26.5 | 73.5 | 25 | 76 |
| 10 | 666 | 26.5 | 73.5 | 25 | 76 |
| 11 | 660 | 31.5 | 68.5 | 25 | 79 |
| 12 | 658 | 100 | 0 | 90 | 45 |

These results indicate that the average central tensile stress induced in the glass increases as the proportion of powdered ferrite in the mixture increases at least up to 32.5% by weight of ferrite. The ferrite alone gives a lower stress and requires a large amount of fluidising air to avoid agglomeration.

Regulation of the toughening stresses induced in the glass may also be achieved by regulation of the current supplied to the motor windings, and also by regulation of the frequency of the electrical supply.

This is illustrated with reference to the following further examples which were obtained using a container 5 which is 80 mm wide and linear induction motors 13 and 14 having windings which were 2 slot per pole per phase, 5/6 chorded, with a pole pitch of 110 mm. Each coil of the winding contained 9 turns.

Examples 13 and 17 following show the effect on the central tensile stress induced in 2.3 mm glass, of variation of the current supplied to the linear motors 13 and 14 in the range 40 to 80 amperes.

The particulate material was a mixture of the same barium hexaferrite and aluminum trihydrate as were used in Examples 1 to 12. The mixture consisted of 25% by weight of the barium hexaferrite and 75% by weight of the aluminum trihydrate. The rate of air supply was 25 liters/min.

| Example | Glass Temperature °C. | Current Amperes | Average Central Tensile Stress MN/m² |
|---|---|---|---|
| 13 | 657 | 40 | 53 |
| 14 | 664 | 50 | 56 |
| 15 | 665 | 60 | 63 |
| 16 | 663 | 70 | 65 |
| 17 | 664 | 80 | 70 |

The apparent trend is that the induced average central tensile stress increases significantly with increasing current or power input to the motor windings.

Examples 18 to 21 show the effect on the average central tensile stress induced in 2.3 mm thick glass of variation of the frequency of the electrical supply in the range 50 to 87 Hertz at a substantially constant current of 30 Amperes.

The particulate material was the same mixture of 25% by weight of barium hexaferrite with 75% by weight of aluminium trihydrate as used in Examples 13 to 17. A single motor of the type as used in Examples 13 to 17 was employed and the rate of air supply was again 25 liters/min.

| Example | Glass Temperature °C. | Supply Frequency Hertz | Average Central Tensile Stress MN/m² |
|---|---|---|---|
| 18 | 665 | 50 | 60 |
| 19 | 665 | 62 | 65 |
| 20 | 662 | 75 | 67 |
| 21 | 669 | 87 | 70 |

Examples 18 to 21 showed a trend for the induced average central tensile stress to increase with increasing frequency of the power supply.

The glass may be of any thickness, for example from 1 mm to 25 mm. The following Examples 22 and 23 illustrate the thermal toughening of glass sheets of overall size 300 mm×300 mm which were quenched in a dispersion of a powder comprising 25% by weight of barium hexaferrite of mean particle size 60 μm, and particle size range 20 to 125 μm, mixed with 75% by weight of aluminum trihydrate of mean particle size 60 μm and particle size range 20 to 120 μm.

| Example | Glass Thickness (mm) | Glass Temperature °C. | Average Central Tensile Stress MN/m² |
|---|---|---|---|
| 22 | 10 | 665 | 150 |
| 23 | 12 | 665 | 165 |

Permanently magnetized materials having a lower retentivity than the magnetoplumbites described above could be used in particulate form, for example iron-/cobalt/nickel/aluminum alloys.

The particulate material may be in the form of composite particles of ferromagnetic material and non-magnetic refractory material, in which case the intensity of treatment of the sheet material, for example the intensity of thermal toughening of the glass, depends on the relative proportions of the constituents of the particles.

The linear induction motors 13 and 14 could be mounted so that their limbs 16 were offset from each other instead of being opposite each other, thereby adapting the motors effectively to stagger the poles of one motor with respect to the poles of the other motor. Another way of achieving this is by varying the electrical connections of the three-phase supply. A combination of physical and electrical staggering is possible. These variations give a more complex form to the upwardly travelling electromagnetic field.

The invention was also carried out with the motors 13 and 14 turned sideways so that the electromagnetic field travels horizontally in the treatment space. For example, the vertically-arranged linear motors may be turned through 90° so that the field travels horizontally through the treatment space 7.

In another arrangement a horizontal treatment space between two horizontally-disposed linear motors may lie in the path of flat or curved glass sheets which are being processed while being conveyed horizontally along a horizontal conveyor which conveys the hot glass sheets from a furnace, through a bending station and into a treatment space. In addition to dispersing the powder the effect of electromagnetic fields which travel linearly in the horizontal treatment space, for example in a direction transverse to the direction of advance of the glass sheets through the treatment space, is to cause the particulate material to spill from one side of the treatment space where it is collected and recycled into the treatment space.

The container 5 may be made of a plastics material, for example polymethylmethacrylate. In a modification the linear induction motors may be encapsulated in a plastics material moulded to have front flat faces which are built into the apparatus as the larger side walls of the container.

Alternatively the fully encapsulated motors may be immersed in the particulate material in the container. A sufficiently thick layer of encapsulating material on the faces of the motors prevents the magnetised material from clinging to the faces of the motors and forming an imobile layer. A sheet of non-magnetic material such as plywood may be fixed to each motor face for the same purpose.

We claim:

1. A method of thermally toughening a glass sheet, comprising:
   (a) employing linear induction means to generate in a treatment space a travelling electromagnetic field which travels linearly through the treatment space,
   (b) subjecting a particulate material consisting of or containing permanently magnetized particles to the influence of said travelling electromagnetic field which is effective to sustain an agitated dispersion of said particulate material in said treatment space,
   (c) heating a glass sheet to a temperature above its strain point,
   (d) maintaining said dispersion of particulate material at a temperature such that the hot glass sheet is toughened when quenched in the dispersion, and
   (e) quenching the hot glass sheet in the dispersion to toughen the sheet.

2. A method according to claim 1 for thermally treating flat glass, comprising subjecting the particulate material to a linearly travelling electromagnetic field which is applied over the whole treatment space.

3. A method according to claim 2, wherein the electromagnetic field is an upwardly travelling field.

4. A method according to any one of claims 1, 2 or 3, comprising gas-fluidising the particulate material, which material comprises particulate non-magnetic material mixed with permanently magnetized particles, and subjecting the gas-fluidised particulate material to said travelling electromagnetic field.

5. A method according to any one of claims 1, 2 or 3, comprising gas-fluidising the particulate material which comprises powdered alumina, alumino-silicate, aluminium monohydrate, aluminum trihydrate, or sodium bicarbonate, mixed with the permanently magnetised particles, and subjecting the gas-fluidised mixed particulate material to said travelling electromagnetic field.

6. A method according to any one of claims 1, 2 or 3, wherein the permanently magnetised particles are particles of a ferrite material.

7. A method according to any one of claims 1, 2 or 3, wherein the permanently magnetised particles are particles of a magnetoplumbite having the general formula $$AO.6B_2O_3$$

where A is divalent barium, strontium or lead and B is trivalent aluminum, gadolinium, chromium or iron.

8. A method according to claim 7, wherein the magnetoplumbite is barium hexaferrite ($BaO.6Fe_2O_3$) or strontium hexaferrite ($SrO.6Fe_2O_3$).

9. A method according to claim 1, comprising sustaining said dispersion by travelling electromagnetic fields which are effective from opposite sides of the treatment space, and moving the glass into the dispersion along a path nearer to one side of the treatment space.

10. A method according to claim 1, comprising sustaining said dispersion by linearly travelling electromagnetic fields which travel upwardly and are effective from opposite sides of the treatment space, and moving the glass into the dispersion along a path nearer to one side of the treatment space.

11. A method of thermally treating an article with a articulate material in a treatment space comprising:
(a) employing linear induction means to generate in said treatment space a travelling electromagnetic field which travels linearly through the treatment space,
(b) subjecting a particulate material consisting of or containing permanently magnetized particles to the influence of said travelling electromagnetic field in said treatment space which is effective to sustain an agitated dispersion of said particulate material in the treatment space, said particulate material being at a different temperature with respect to said article, and
(c) contacting the article with the dispersion of particulate material in the treatment space whereby heat is transferred.

12. Apparatus for treating an article including means defining a treatment space for containing a particulate material, means for advancing the article into the treatment space, and linear induction means mounted so as to generate a travelling electromagnetic field which travels linearly through the treatment space and is of sufficient intensity to sustain in the treatment space an agitated dispersion of the particulate material which consists of or contains permanently magnetised particles.

13. Apparatus according to claim 12, comprising a linear induction motor mounted at one side of a container which defines the treatment space, which motor is oriented to generate an upwardly travelling electromagnetic field in the container and thereby create the dispersion of the particulate material in the treatment space.

14. Apparatus according to claim 12, for thermally toughening a glass sheet, comprising two linear induction motors respectively mounted at oppositely facing sides of the container which is of elongated rectangular cross-section and has an open top, which motors are operable to cause agitation of the particulate material in the container.

15. Apparatus according to claim 14, wherein the motors are adapted effectively to stagger the poles of one motor with respect to the poles of the other motor.

16. Apparatus according to claim 13 or claim 14, including cooling means mounted at the bottom of the container to cool the particulate material which collects at the bottom of the container.

17. Apparatus according to any one of claims 12 to 15, characterised by gas supply means mounted at the bottom of the container to supply fluidising gas into the particulate material at the bottom of the container.

* * * * *